(12) United States Patent
Laiho et al.

(10) Patent No.: US 7,535,849 B2
(45) Date of Patent: May 19, 2009

(54) METHOD FOR COMMUNICATION NETWORK PERFORMANCE ANALYSIS

(75) Inventors: Jaana Laiho, Veikkola (FI); Wolfgang Steffens, Veikkola (FI)

(73) Assignee: Nokia Corporation, Epsoo (FI)

( * ) Notice: Subject to any disclaimer, the term of this patent is extended or adjusted under 35 U.S.C. 154(b) by 782 days.

(21) Appl. No.: 10/518,911

(22) PCT Filed: Jun. 26, 2002

(86) PCT No.: PCT/IB02/02428

§ 371 (c)(1),
(2), (4) Date: Jan. 24, 2005

(87) PCT Pub. No.: WO2004/004371

PCT Pub. Date: Jan. 8, 2004

(65) Prior Publication Data

US 2005/0254501 A1    Nov. 17, 2005

(51) Int. Cl.
*H04J 1/16* (2006.01)
(52) U.S. Cl. .................... 370/241.1; 370/254; 455/423; 455/456.1; 709/221; 709/224
(58) Field of Classification Search ...................... None
See application file for complete search history.

(56) References Cited

U.S. PATENT DOCUMENTS 5,598,532 A    1/1997    Liron
5,694,451 A *  12/1997   Arinell .................... 379/32.04
5,920,607 A    7/1999    Berg
6,266,514 B1 * 7/2001    O'Donnell ............... 455/67.13
6,442,393 B1   8/2002    Hogan
6,459,695 B1 * 10/2002   Schmitt ..................... 370/344
6,463,287 B1 * 10/2002   Wegner ................... 455/456.1
7,113,793 B2 * 9/2006    Veerasamy et al. ....... 455/456.1
2002/0103010 A1 * 8/2002 Thomas et al. ............. 455/560

FOREIGN PATENT DOCUMENTS

EP    0 431 956 A2    6/1991
WO    WO 98/24208     6/1998

* cited by examiner

*Primary Examiner*—Edan Orgad
*Assistant Examiner*—Brian Roberts
(74) *Attorney, Agent, or Firm*—Squire, Sanders & Dempsey L.L.P.

(57) ABSTRACT

The present invention relates to a method for communication network parameter setting comprising the steps of a) acquiring and storing information related to a1) service requests issued by terminals attached to the network, a2) positions of the terminals, and a3) establishment of the requested service for the terminals, b) matching, based on the position information, the information to a grid of unit areas, the grid of unit areas representing a geographical region in which the network is operated, c) processing the information per unit area, d) outputting the processed information and e) modifying communication network operating parameters based on the outputted processed information.

13 Claims, 6 Drawing Sheets

METHOD FOR COMMUNICATION NETWORK PERFORMANCE ANALYSIS

FIELD OF THE INVENTION

The present invention relates to a method for communication network performance analysis.

BACKGROUND OF THE INVENTION

Recently, communication networks have widely spread and are used by a continuously increasing number of subscribers. In order to cope with the increasing number of subscribers and correspondingly the increasing number of terminals of said subscribers which are potentially attached to the network for communication purposes, communication networks have to be most carefully planned in order that the network can be operated smoothly while meeting all requirements of the subscribers.

It is to be noted that the present invention is not limited to a specific type of communication network. It may be for example a wireless communication network such as the UMTS network or any other communication network. Also, network planning is to be understood as a process of setting network operating parameters such as transmit power, antenna characteristics, selection of transmitter sites and/or decision to install further transmitter sites. (A transmitter site in the example of a UMTS network means a Node_B (corresponding to a base station BS in GSM)). In order to effectively perform such a network planning, however, a most properly executed network performance analysis is required, since otherwise network planning would result in a mere "trial and error" process which is cumbersome and rather time consuming, and the success of which is doubtful and can not be verified quantitatively.

The requirements of the users to be met by the communication network can be deemed to be represented by the services the subscribers have subscribed to and among which they may select for communication purposes.

The definition of the term "service" as used herein is to be understood in its broadest sense and can, for example, be a PDP (Packet Data Protocol) context, while if the end user service (the actual application run on the terminal such as e.g. TCP/IP (Transmission Control Protocol/Internet Protocol) or voice call, SMS (Short Message Service), video conferencing) is known, also that can be used as definition of the service. More generally, a service is characterized by at least one service attribute, which is for example bit rate, BLER (service performance target) and Eb/No (energy per bit over noise) or a combination of these and/or others known in the field of communication networks. The main issue is that the definition of service is related to a set of at least one attribute and these attributes define the dimensions of the "information matrix" to be used. The mobile network has for example the following attributes concerning the "service": The service performance target (BLER), Eb/No target, and/or the used bit rate. Also, the definition of service can be dependent on performance management (PM). PM is defining with what abstraction the service can be detected (UMTS traffic class (real-time, interactive, streaming, background) vs. the actual service (e.g. different real-time services distinguishable by used bit-rate) etc.)

Setting of network operating parameters in a way so as to improve and/or optimize the network performance requires a knowledge of the "behavior" of the network, in particular in downlink direction (from the transmitter stations to the terminals).

Traditionally the downlink direction information for optimization purposes has been very difficult to acquire. The only way to collect coverage related data has been with drive tests with field tool and this requires relatively lot manpower which makes data collection quite expensive and also time consuming. Furthermore, the field tool data has not been transferred to Network Management System (NMS) for further analysis and thus the coverage information is based either on planning tool (very inaccurate) or statistical "snapshots" based on drive tests in the network (these are in addition only related to a limited area of the network dependent on the number of drive tests conducted simultaneously).

SUMMARY OF THE INVENTION

Consequently, it is an object of the present invention to provide an improved method for communication network performance analysis.

According to the present invention, the above object is for example achieved by a method for communication network performance analysis comprising the steps of
  a) acquiring and storing information related to
    a1) service requests issued by terminals attached to said network,
    a2) positions of said requesting terminals, and
    a3) establishment of the requested service for said terminals,
  b) matching, based on the position information, said information to a grid of unit areas, the grid of unit areas representing a geographical region in which said network is operated,
  c) processing said information per unit area,
  d) outputting said processed information.
According to favorable further developments
  the method comprises a step of modifying communication network operating parameters based on said outputted processed information,
  said information related to the establishment of the service comprises at least a success indication indicating that said service was successfully established or not and at least one service attribute;
  said processing comprises a step of logically combining said service request information and said success information;
  said processing comprises a further step of summing said at least one service attribute parameter;
  said processing comprises the further steps of
    sorting said stored information according to said at least one service attribute, thereby obtaining a plurality of information sets, each being representative of an individual service distinguishable by said at least one service attribute, and
    selecting one of said information sets according to the service attribute for being output;
  said acquired information is stored for a predetermined time;
  said processing comprises a step of filtering said stored information using a selectable time window.
  said summed at least one service attribute parameter is divided by the time period defined by said selected time window.

By virtue of the present invention, which includes the terminal position information to a certain event/measurement as additional information for the network optimization process, basically the following advantages can be achieved:
  network planning can be achieved at lower costs since drive tests can be dispensed with, service coverage information is collected in an automatic manner and in a centralized manner at for example in the network management system NMS, (once collected, it may, however, be transferred and/or distributed to other entities)

permanently tracing a terminal is no longer required (while still possible), so that less information is to be collected and managed, as only the service request location and information on the success of the request is collected together with at least one service attribute, the proposed method is applicable to any mobile/cellular communication network utilizing positioning methods.

Thus, with this invention it is possible to create service maps (a grid of unit areas) by utilizing advanced positioning methods to collect service "coverage area" data from the network for optimization purposes. These maps can be used as visual input for the operator when comparing the intended and real network performance. Hence, modifying communication network operating parameters based on said outputted processed information as represented in the created maps is enabled.

Thus, stated in other words, according to the present invention it is conceived to combine the terminal service request and position information and collect this data in a centralized manner. As a result a statistical coverage map can be generated and output, i.e. a geographical map showing areas where a certain service has been successfully provided. Another issue is to utilize the same data but take another projection of it and display (e.g. busy hour) throughput statistics on a map. The resolution of this map is the same as the accuracy of the positioning method, which has a higher resolution than the cell resolution. Thus, as an additional benefit of this invention, the traditional cell coverage area based analysis and visualization can be dispensed with. The resolution of the information matrix depends on the resolution of the used location information. Current networks provide at least cell-id information. This performance is increased by the present invention by utilizing more advanced location based services (LCS) positioning methods.

The modifying step is mostly performed in an iterative manner and can be implemented automatically or involve the interaction of an operator.

BRIEF DESCRIPTION OF THE DRAWINGS

In the following, the present invention will be described in greater detail with reference to the accompanying drawings, in which.

DETAILED DESCRIPTION OF THE EMBODIMENTS

Now, the present invention will be described with reference to the attached drawings.

Figure 3:
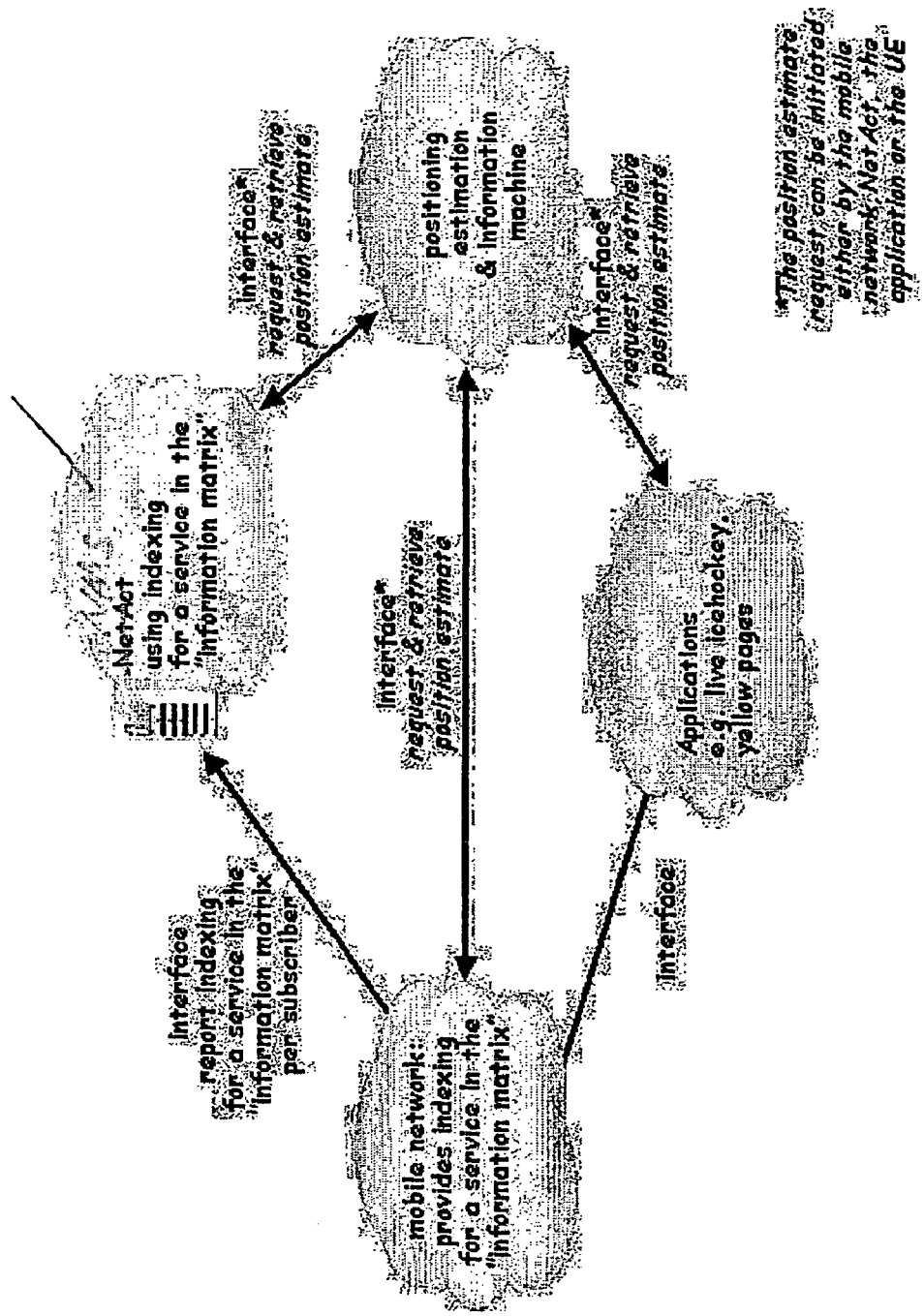
FIG. 3 shows a block circuit representation of entities involved in the present method and some signaling there between in connection with an embodiment of the present invention.

FIG. 3 shows a block circuit representation of entities involved in carrying out the present method and some signaling there between in connection with an embodiment of the present invention. As shown in FIG. 3, when implementing the present invention there are involved the mobile network including all network entities, applications run on and/or by means of the mobile network such as live icehockey transmissions, yellow pages or email. For illustration purposes a position estimation and information machine (e.g. a mobile location center such as a GMLC (Gateway Mobile Location Center) or SMLC (Serving Mobile Location Center)) and a network management or corresponding system entity denoted as NMS are shown separately, even though they may be considered as forming part of the mobile network as such.

Between these entities, requests and resulting information can be transmitted via interfaces. A position estimation request to the position estimation and information machine can be initiated either by the mobile network (i.e. a control entity thereof), the network management system NMS, the application or the terminal (User Equipment UE). In response to such a request, the position estimation and location machine retrieves the position estimate of individual terminals. The position information is associated to services requested for and/or used by the terminals. Hence, as a result, information related to service requests issued by terminals attached to said network, positions of said requesting terminals, and establishment of the requested service for said terminals is acquired and stored in the network management system NMS.

The mobile network reports to the network management system information related to the establishment of the service which comprises at least a success indication indicating that said service was successfully established or not and at least one service attribute. This indication is provided for each terminal, i.e. per subscriber attached to the network.

Based on the service attribute, indexing of the service can be accomplished. This means that for each service a separate set of information is maintained and that each set of information is selectable for being processed/displayed based on the at least one service attribute. More precisely, for a terminal issuing a service request it is acquired and stored that the terminal issued a request, whether the request was successful or not, to which service the request belonged and the position information of the terminal.

Figure 4:
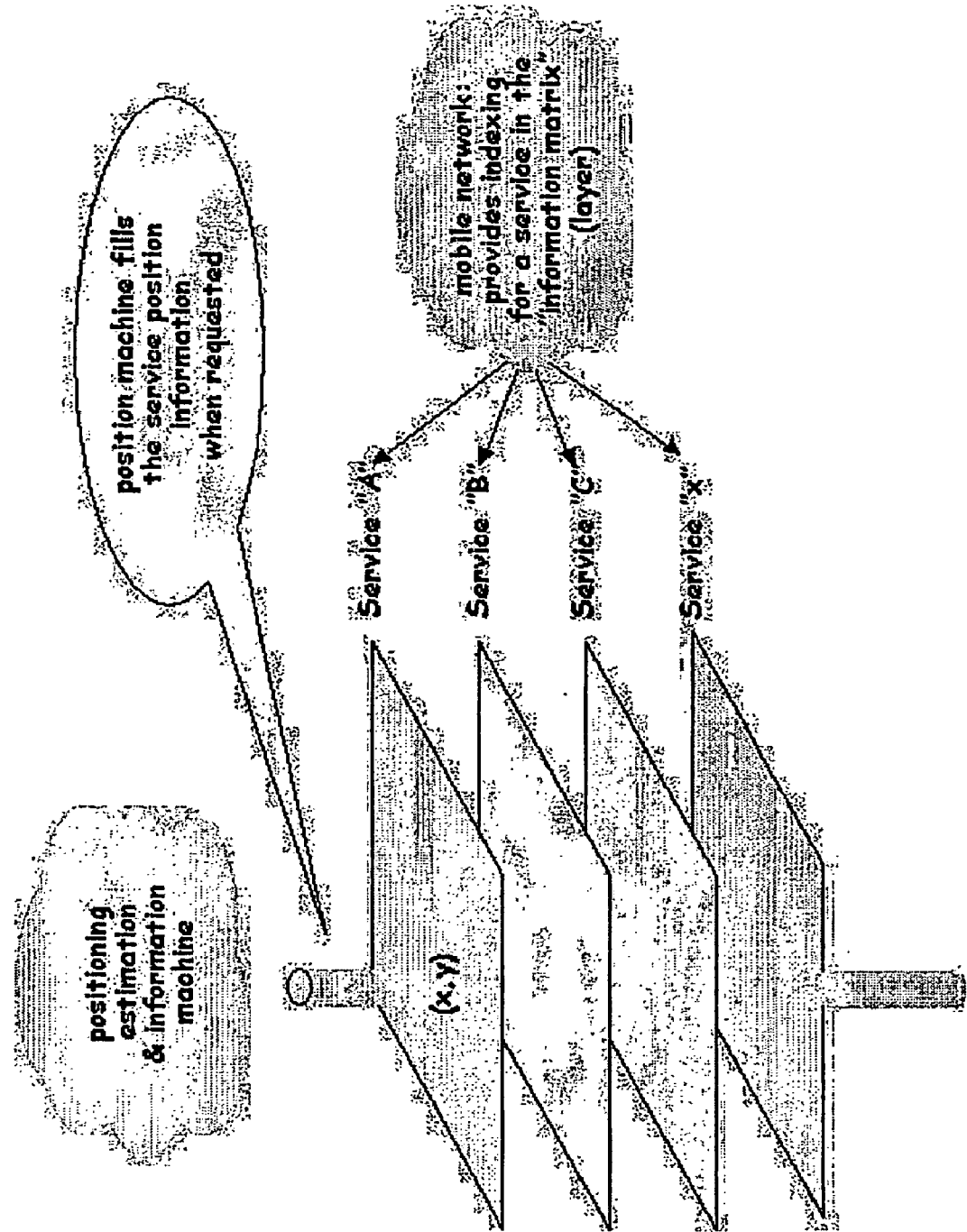
FIG. 4 shows an illustration of several layers of information, each layer representing a service, the services being distinguishable by means of a service attribute.

This is illustrated in FIG. 4. FIG. 4 shows an illustration of several layers of information, each layer representing a service, the services being distinguishable by means of a service attribute. As mentioned before, the mobile network provides an indexing for a service in the information matrix. Thus, information related to services A, B, C, X are stored and the position machine fills the service position information upon request (of the respective service by a terminal). For example, service A, B, C, X are characterized by the service attribute bitrate, and the service attribute parameter is the individual bitrate such as 16 kbit/s, 32 kbit/s, 64 kbit/s or 128 kbit/s, whether this bitrate is the user bitrate, or including some overhead is not relevant for the method. Here, filling means that there is performed a matching, based on the position information, of said information to a grid of unit areas, the grid of unit areas representing a geographical region in which said network is operated. Stated in other words, the information is mapped to e.g. an x-y-coordinate system. A minimum resolution of the coordinate system could e.g. be 10*10 m and be graphically represented as a single pixel (display picture element). Other resolutions are nevertheless also possible.

Thus, said stored information is sorted according to said at least one service attribute, thereby obtaining a plurality of information sets, each being representative of an individual service distinguishable by said at least one service attribute, and one of said information sets is selectable according to the service attribute for being output. Of course, more than one sets can be selected for being output simultaneously.

However, it is also possible to generate a map based solely on the information related to the location services: what service is active in which area of e.g. the city. In this connection, it has to be noted that the information related to the establishment of the service comprises at least a success indication indicating that said service was successfully established or not and at least one service attribute (for identifying the service).

Figure 5:
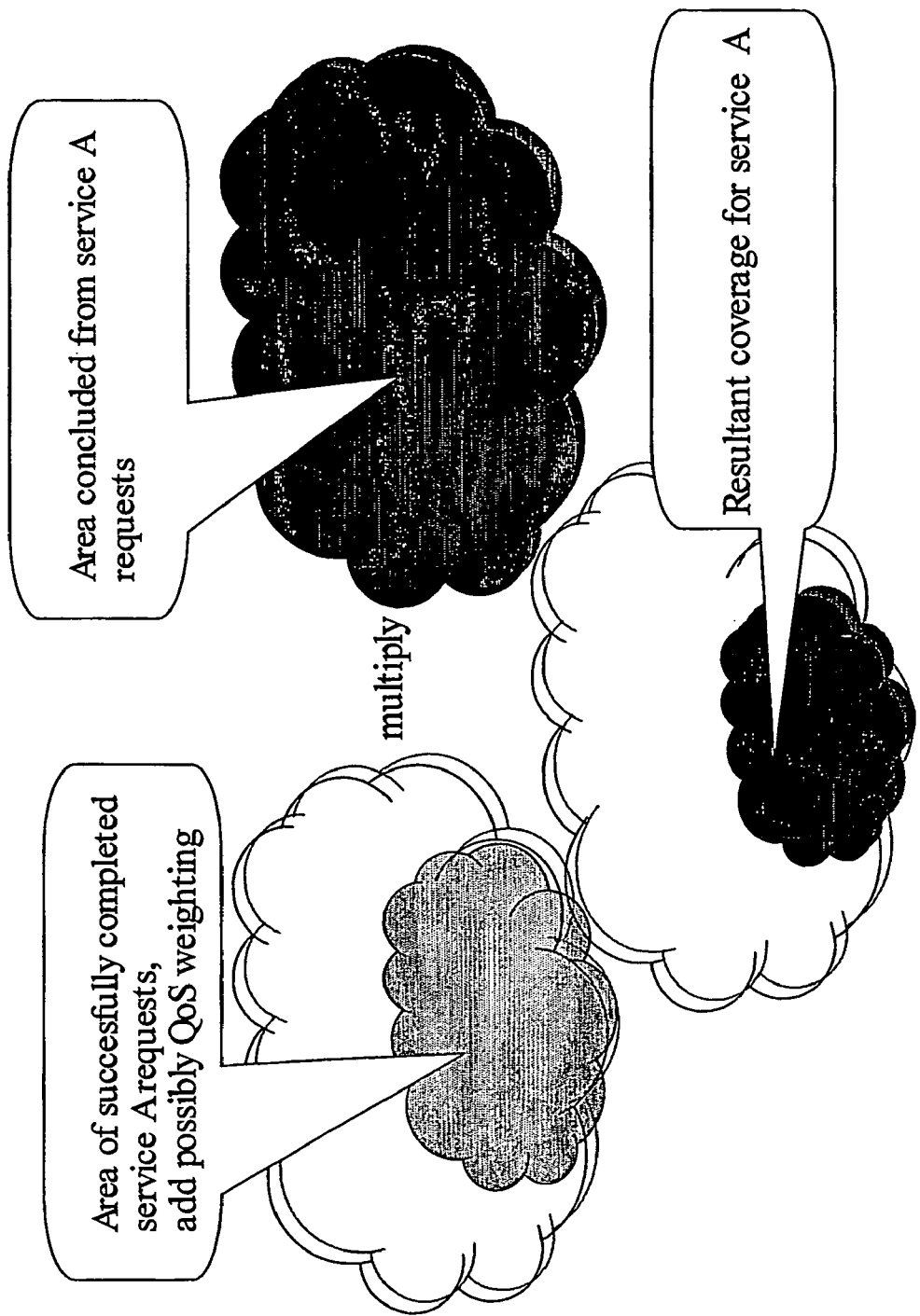
FIG. 5 shows an illustration for explaining logically combining said service request information and said success information.

The processing comprises a step of logically combining said service request information and said success information as illustrated in FIG. 5. An area concerned is represented by a "cloud". The cloud on the right represents the entire area in which terminals issued a service request for a specific service such as service A. The cloud on the left represents the same geographical entire area, however only in a part of that area the service requests were successful so that the service could be established at all (optionally weighted/multiplied by established quality of service QoS such as the established bit-rate or the like). The resultant coverage area is represented in the lower cloud by the gray shaded portion.

Apparently, in the illustrated example, the logically combining corresponds to a logical AND. Nevertheless, any other (logical) combining can be performed such as NAND, which then results in the complementary area indicating the area in which the requested service could not be established.

Note that when the features according to the present invention are activated, the service request is "marking" (or preparing) service layer in the information matrix, the position is requested from the "positioning estimation machine", and position information is filled to the "information layer" marked before. A "cloud" (right hand one) in FIG. 5 corresponds thus to one of the layers for respective services shown in FIG. 4. Additionally there is another information matrix (cloud on the left in FIG. 5) related to the service success, this is filled in similar manner as before (filled with 0 and 1). Also, it is possible to generate one or more other weight layers related to service performance (or QoS) and use that weighting also when determining the service coverage plot. A weight layer may also be referred as service success map, and a weight layer may be established per service attribute. (It is further to be noted that instead of a service success map, the complementary information, i.e. a service failure map can be established and used, as the service failure is also to be regarded as information related to the establishment of the requested service for said terminals and the service success map includes an indication whether the service was successful or not.) For example, services may be identified as successfully established real-time services, and among these, weighting according to e.g. the bit-rate can be performed, which means that a real-time service of a specific bit-rate is selected.

After these (at least) two matrices are filled, the UE identification (IMSI etc.) can be released. This results in the map representation being established anonymously without identification of individual terminals.

Furthermore, since the evaluation is based on a limited/discrete number of data corresponding to the number of terminals requesting and/or using a service, the grid of unit areas is not continuously filled but filled with discrete data only. Therefore, in order to improve graphical representation when outputting the processed data, interpolation and/or extrapolation or other techniques such as those relying e.g. on neural networks can optionally be used in order to conclude data for "missing" pixels (unit areas of the grid). Outputting processed data can be performed as a map per individual service or cumulative for all services together in the same representation, or for a specific service attribute of a service (for an individual service or for several services cumulative provided that these services have the same service attribute) or the like. It is however to be noted that even though outputting has been referred to herein above as outputting in a map representation, outputting can be performed visually or acoustically, and if visually, as a representation of a map or as bar diagrams or the like.

Figure 2:
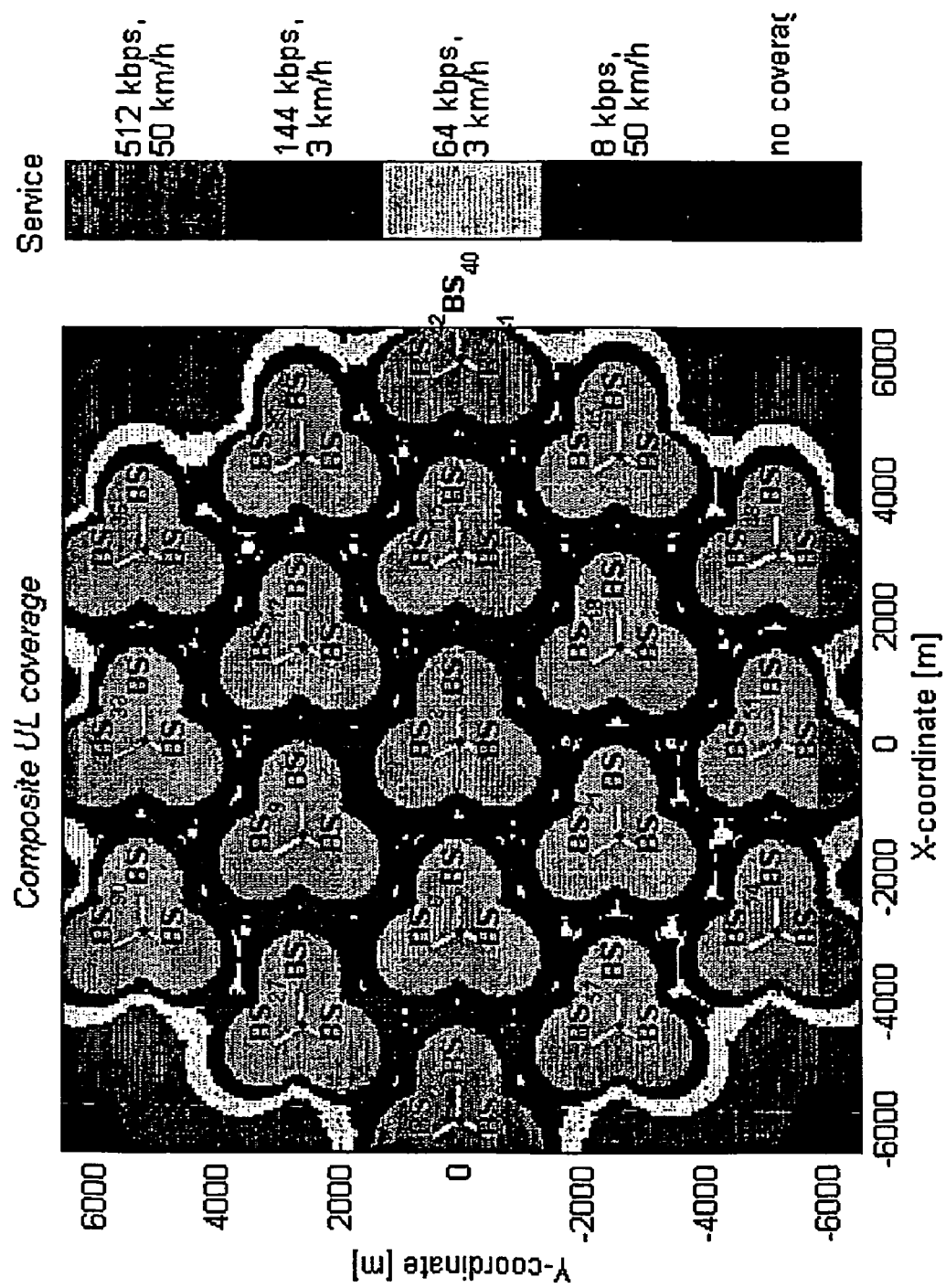
FIG. 2 shows an example of a grid of unit areas, the grid of unit areas representing a geographical region in which said network is operated, with information related to at least one service processed per unit area being outputted.

FIG. 2 shows an example of a grid of unit areas, the grid of unit areas representing a geographical region in which said network is operated, with information related to at least one service processed per unit area being outputted. This figure represents the result of a processing which comprises the further steps of sorting said stored information according to said at least one service attribute, thereby obtaining a plurality of information sets, each being representative of an individual service distinguishable by said at least one service attribute, and selecting one of said information sets according to the service attribute for being output. Namely, as shown in FIG. 2, there are different services distinguished by the bit-rate as a service attribute and additionally the speed of the terminal. Here, the services are displayed simultaneously in the x-y coordinate system, each services provisioned in a respective area being represented in a different shade of gray. Color representation is of course also possible. Nevertheless, a corresponding map can be established also with only a single service area being displayed.

Stated in other words, FIG. 2 represents a service coverage map. In order to be able to provide such a service coverage map, according to the present invention the following measures are initiated, as has been described above:

1. Acquire and store the service request information and related position information (derived by position estimation machine e.g. GMLC, SMLC & related middleware et al). The storing is done for e.g. a predetermined period of time. The length of the period depends on the purpose of the analysis, that is, one month storage period is sufficient if the analysis is conducted for periods up to one month or shorter periods. Store in similar manner information about requests, which were successfully completed (service success map).

2. Process the stored information so that the information is per pixel and per service basis (e.g. 10 m×10 m map area, typically digital maps in planning tool/NMS consists of pixels). Stated in other words, perform a matching, based on the position information, of said information to a grid of unit areas, the grid of unit areas representing a geographical region in which said network is operated.

3. As an option, choose a time filter for the coverage map (e.g. time of the day, rush hour, weekends, last two weeks, or the like) to select data for one output plot/display by filtering the data with the time filter.

4. Weight (multiply) the service request map(s) with the service success map(s), i.e. perform a logical combining of these information.

5. Optionally, interpolate/extrapolate/use advanced methods like neural networks to conclude the data for missing pixels, or just leave empty pixels blank.

6. Plot service coverage map(s) or output the processed information otherwise, e.g. on a display device connected to the network management system NMS or corresponding system. This outputting can be performed per individual service or "cumulative" for all services on the same plot.

Individual services can be selected based on at least one service attribute such as bit-rate and/or delay requirement or any other QoS parameter by means of which services can be distinguished.

Figure 6:
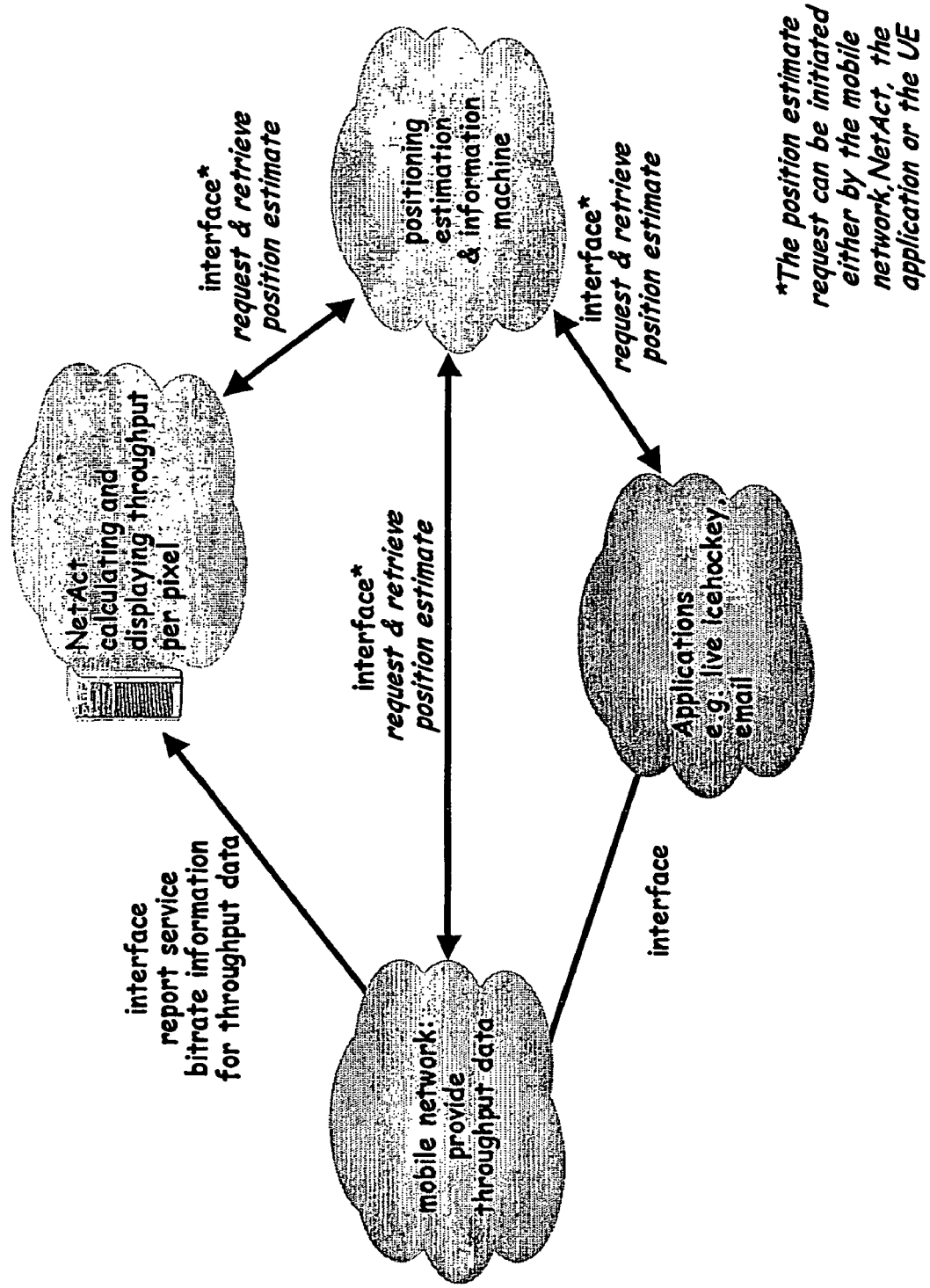
FIG. 6 shows a block circuit representation of entities involved in the present method and some signaling there between in connection with another embodiment of the present invention.

FIG. 6 shows a block circuit representation of entities involved in the present method and some signaling there between in connection with another embodiment of the present invention. The block circuit representation is identical to FIG. 3, while instead of "per service" data representation, now the service attribute parameters are concerned. More precisely, according to this embodiment, throughput data are informed from the network to the network management system. It is however, to be noted that these data are also present in the previous example, and can be extracted from the available data sets with a suitable processing. In the presently concerned embodiment, throughput data correspond to the bit-rate of the respective services, and the processing comprises summing the bit-rates of the individual services established in a unit area of the grid.

Figure 1:
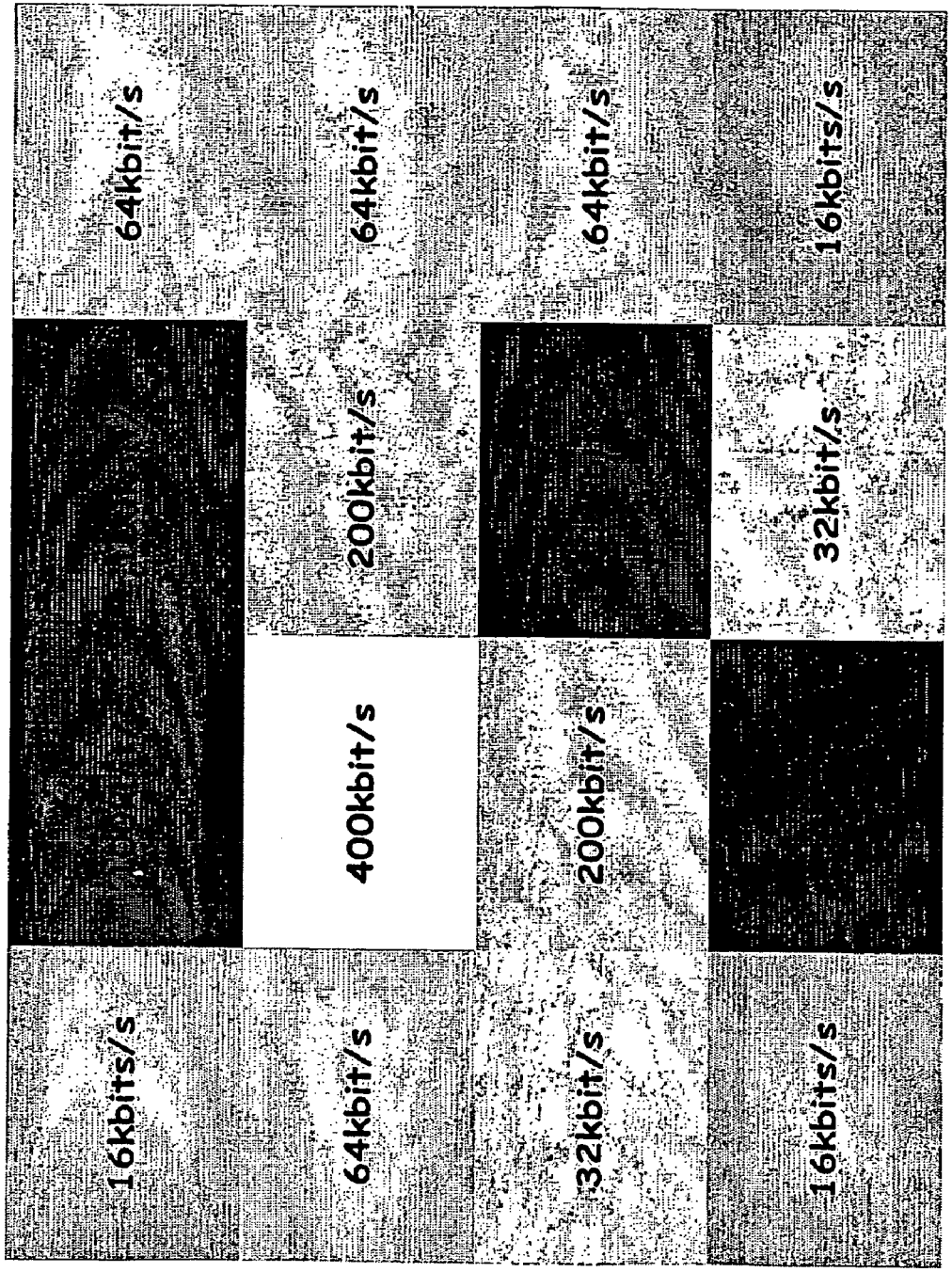
FIG. 1 shows an example of a grid of unit areas, the grid of unit areas representing a geographical region in which said network is operated, with information related to at least one service attribute parameter processed per unit area being outputted.

Such a processing yields a map representation as shown in FIG. 1. FIG. 1 shows an example of a grid of unit areas, the grid of unit areas representing a geographical region in which said network is operated, with information related to at least one service attribute parameter processed per unit area being outputted. That is, here, each unit area represents the summed bit-rate of the services requested and/or activated in the unit area. The summed bit-rate thus provides throughput information in the area concerned and is indicative of an amount of data transfer at a given time period in a given area.

Stated in other words, FIG. 1 represents a throughput map. In order to be able to provide such a throughput map, according to the present invention the following measures are initiated, as has been described above:

1. Store the service request information, completion (success) information and related position information (derived by position estimation machine e.g. GMLC, SMLC & related middleware et al), e.g. for predetermined period of time. The length of the period depends on the purpose of the analysis, as mentioned previously above.

2. Process the above information so that the information is per pixel basis (this time not per service) (e.g. as mentioned previously, 10 m×10 m map area, typically digital maps in planning tool/NMS consists of pixels), (including a logical combining of the information as mentioned above in connection with the coverage map)

3. Optionally, choose a time filter for the throughput map (e.g. time of the day, busy hour, weekend, last two weeks or the like) to select data for one output plot/display by filtering the data with the time filter.

4. For throughput estimation, sum the bit-rates of the services in the same pixel, i.e. per unit area of the grid. (This yields the integrated bit-rate value over the storage cycle.) Then, as an option, divide the sum with the time period defined by the time filter used for data processing. (This yields the average bit-rate during the time defined by the time filter, i.e. in the time window thus defined.)

5. Optionally, interpolate/extrapolate/use advanced methods like neural networks to conclude the data for missing pixels, or just leave empty pixels blank.

6. Output throughput map(s) as a result of the processing. FIG. 1 shows several throughput maps simultaneously as throughput bit-rates of 16 kbit/s, 32 kbit/s, 64 kbit/s, 100 kbit/s, 200 kbit/s, and 400 kbit/s are simultaneously displayed which could also be displayed separately.

Herein before, the invention has been described with a focus on specific embodiments thereof. However, it has to be noted that It is also possibly to utilize also different steps to conclude e.g. the service coverage, and herein above only one example has been given. Another possibility is to store the locations of successful "service releases", as a service release information is also considered to represent information related to service requests. The benefit of these methods is that only the service request/release location is collected and information on the success of the requested service.

Tracing a terminal (mobile station) which uses a specific service X is another possibility. This method is requiring more data to be collected. Tracing means continuous monitoring and following the terminal through the network.

All the proposed methods can also combined and utilize the combination information when determining e.g. the service coverage map.

In addition to the "success layer" it is possible to utilize a QoS (service performance) layer when determining the resultant service coverage plot. Naturally for this the QoS information must be collected.

A benefit of time filter resides in that it is possible to compare the service coverage in busy hours versus "quiet" times. This demonstrates the effect of cell breathing.

Furthermore: operators (or virtual operators), apart from their technical network planning and optimization efforts, can use this information in their business planning: for example, with pricing the coverage maps can be tailored.

Location information is a new dimension for the optimization process. The current cell based thinking is more a limitation than benefit. If the terminal location information can be effectively utilized, the optimization can concentrate on geographical locations and prioritizing those rather than prioritizing of cells. Also, the accuracy of the pure cell identifier is not sufficient to collect the described information. Therefore advanced positioning methods should be applied. Those methods could be enhanced cell-based methods (e.g. TA (Timing Advance), RTT (Round Trip Time), Rx-level (Rx: Reception)), TOA (Time Of Arrival), AOA (Angle of Arrival), any kind of observed time difference (e.g. E-OTD (Enhanced Observed Time Difference), OTDOA (Observed Time Difference Of Arrival); IPDL (Idle Period Downlink)-OTDOA) and GPS (Global Positioning System) (e.g. A-GPS (Assisted GPS); stand-alone GPS) or any combination of those.

There are several scenarios where the service request and the position of the user can be collected. Those scenarios can be divided into two main categories: one time interrogation (e.g. at the beginning of the service request, at the end or during the service usage), and continuous interrogation (e.g. during the service is used—also referred to as service tracing).

The one-time interrogation has the advantage that it might reflect the real situation quite well and it does not cause too much load to the network. Instead, the continuous interrogation has the advantage of reflecting the dynamics of a real situation much better then the more one-time pseudo-dynamic case. The network must be dimensioned accordingly or off-peak free capacity could be utilized to collect this data.

It has to be noted that the particular manner of collecting the location information e.g. by means of the GMLC or SMLC is out of the scope of the present invention and thus not described in detail. In this regard, the interested reader should refer to other literature/patent applications dealing with that particular topic.

Accordingly, as has been described herein above, the present invention relates to a method for communication network parameter setting comprising the steps of a) acquiring and storing information related to a1) service requests issued by terminals attached to said network, a2) positions of said requesting terminals, and a3) establishment of the requested service for said terminals, b) matching, based on the position information, said information to a grid of unit areas, the grid of unit areas representing a geographical region in which said network is operated, c) processing said information per unit area, d) outputting said processed information and e) modifying communication network operating parameters based on said outputted processed information.

While the invention has been described with reference to a preferred embodiment, the description is illustrative of the invention and is not to be construed as limiting the invention. Various modifications and applications may occur to those skilled in the art without departing from the true spirit and scope of the invention as defined by the appended claims.

The invention claimed is:

1. A method comprising:
acquiring and storing information related to
service requests issued by terminals attached to a network,
positions of said requesting terminals, and
establishment of the requested service for said terminals;
matching, based on the position information, said information to a grid of unit areas, the grid of unit areas representing a geographical region in which said network is operated;
processing said information per unit area; and
outputting said processed information,
wherein said information related to the establishment of the service comprises at least a success indication indicating that said service was successfully established or not and at least one service attribute, and
wherein said processing comprises logically combining said service request information and said success information.

2. The method according to claim 1, further comprising:
modifying communication network operating parameters based on said outputted processed information.

3. The method according to claim 1, wherein said processing comprises summing said at least one service attribute parameter.

4. The method according to claim 3, wherein said summed at least one service attribute parameter is divided by the time period defined by said selected time window.

5. The method according to claim 1, wherein said processing comprises:
sorting said stored information according to said at least one service attribute, thereby obtaining a plurality of information sets, each being representative of an individual service distinguishable by said at least one service attribute; and
selecting one of said information sets according to the service attribute for being output.

6. The method according to claim 1, wherein said acquired information is stored for a predetermined time.

7. The method according to claim 1, wherein said processing comprises filtering said stored information using a selectable time window.

8. An apparatus,
configured to acquire and store information related to
service requests issued by terminals attached to a network,
positions of said requesting terminals, and
establishment of the requested service for said terminals;
configured to match, based on the position information, said information to a grid of unit areas, the grid of unit areas representing a geographical region in which said network is operated;
configured to process said information per unit area; and
configured to output said processed information,
wherein said information related to the establishment of the service comprises at least a success indication indicating that said service was successfully established or not and at least one service attribute, and
wherein said processing comprises logically combining said service request information and said success information.

9. The apparatus according to claim 8, wherein said processing of said information comprises summing said at least one service attribute parameter.

10. The apparatus according to claim 9, wherein said summed at least one service attribute parameter is divided by the time period defined by said selected time window.

11. The apparatus according to claim 8, wherein the apparatus is further configured to:
sort said stored information according to said at least one service attribute, thereby obtaining a plurality of information sets, each being representative of an individual service distinguishable by said at least one service attribute; and
select one of said information sets, according to the service attribute, to be output.

12. The apparatus according to claim 8, wherein said acquired information is stored for a predetermined time.

13. The apparatus according to claim 8, wherein said processing of said information comprises filtering said stored information using a selectable time window.

* * * * *